(12) United States Patent
Cross

(10) Patent No.: US 6,832,754 B2
(45) Date of Patent: Dec. 21, 2004

(54) GAS-LIQUID CONTACTOR

(76) Inventor: Alan Cross, 73 - 34 244th St., Little Neck, NY (US) 11362

( * ) Notice: Subject to any disclaimer, the term of this patent is extended or adjusted under 35 U.S.C. 154(b) by 52 days.

(21) Appl. No.: 10/390,131

(22) Filed: Mar. 18, 2003

(65) Prior Publication Data

US 2004/0183216 A1 Sep. 23, 2004

(51) Int. Cl.[7] .................................................. B01F 3/04
(52) U.S. Cl. ........................ 261/78.2; 261/116; 261/117
(58) Field of Search ........................ 261/76, 78.2, 116, 261/117

(56) References Cited

U.S. PATENT DOCUMENTS

| | | | | |
|---|---|---|---|---|
| 1,741,519 A | * | 12/1929 | Huff ......................... | 261/114.2 |
| 3,218,249 A | * | 11/1965 | Ballard et al. .............. | 208/108 |
| 3,317,197 A | * | 5/1967 | Lohner et al. ................ | 261/24 |
| 3,353,803 A | * | 11/1967 | Wechselblatt et al. ...... | 261/116 |
| 4,421,725 A | * | 12/1983 | Dezael et al. ............... | 423/228 |
| 4,464,309 A | * | 8/1984 | Linhardt ..................... | 261/23.1 |
| 5,158,714 A | * | 10/1992 | Shih et al. .................... | 261/96 |
| 6,220,578 B1 | * | 4/2001 | Popov ......................... | 261/76 |

* cited by examiner

*Primary Examiner*—Scott Bushey

(57) ABSTRACT

A gas-liquid processing device used for contacting a gas stream with a liquid stream and consisting of spray nozzles housed in a containment vessel. The device finds application for transferring, on a continuous basis, chemical constituents from one phase to another. Constituent transfer is facilitated by passing the liquid through low pressure gas assisted spray nozzles, which generate multitudes of small liquid droplets that provide large amounts of surface area between liquid and gas phases. The spray nozzles consist of large diameter tubular elements wherein liquid feed flows, as films and/or rivulets, down the inner surface of the elements. Gravitational forces, and drag forces cause the liquid to fragment, so as to form streams of small diameter liquid droplets in contact with the gas phase. Improved gas-liquid contact times are realized because the droplets flow downward in very nearly vertical and parallel paths.

6 Claims, 1 Drawing Sheet

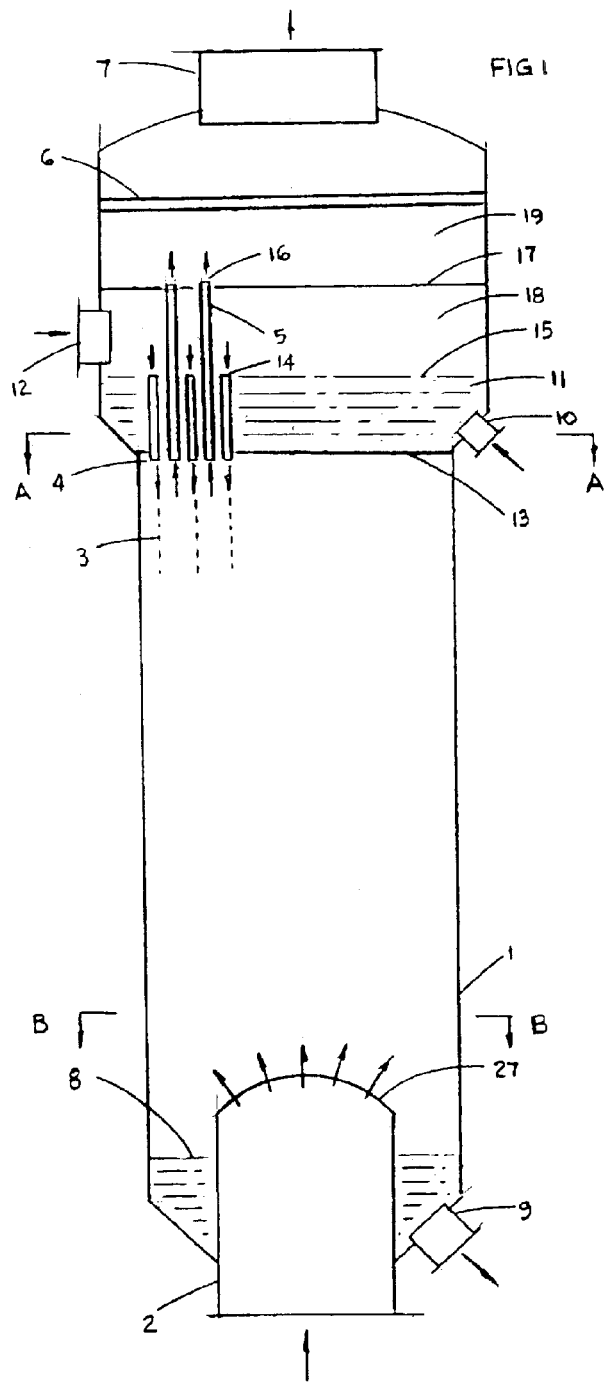
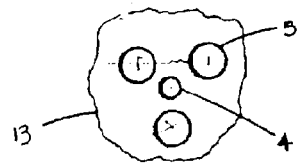
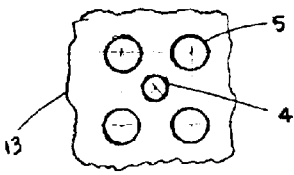
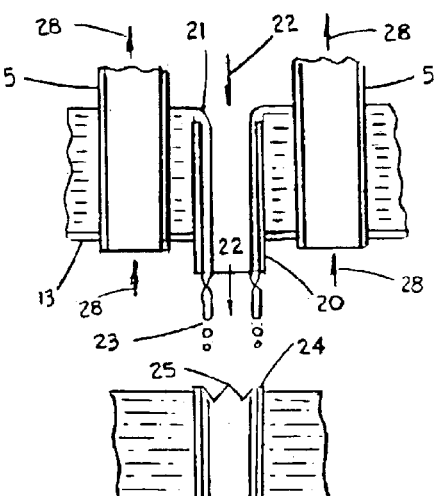
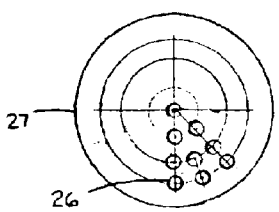

GAS-LIQUID CONTACTOR

BACKGROUND OF THE INVENTION

This invention relates to devices for contacting a flowing gas or vapor stream with a flowing liquid stream, the liquid and vapor being contained in a surrounding vertical containment vessel. Thru use of such devices, the liquid streams can remove gaseous or liquid constituents from the gas streams and transfer same to the liquid streams. The purpose is to recover valuable chemical products from the gas stream or to purge the gas stream of pollutants, such as solid particulates, sulfuric or hydrochloric acid vapors or mists, sulfur compounds such as sulfur dioxide or trioxide, or nitrogen compounds such as nitrous or nitric oxide, the gas stream often consisting of combustion products generated by burning gas, oil or solid fossil fuels, containing elements giving rise to such pollutants in the flue gas stream. Alternatively, the gas liquid contactor can be used for cooling a hot liquid stream with a cold gas stream, as in the case of a water cooling tower. In this device, a stream of hot water is contacted with an air stream flowing countercurrent to the water stream. The air enters the tower at low temperature and humidity, the humidity being the water vapor concentration in the air in pounds of water per pound of dry air, and leaves at higher temperature and humidity. The water evaporating from the liquid stream increases the humidity of the air, and causes the hot liquid to cool by an amount equivalent to the latent heat of vaporization of the evaporated water. The cooled water can be used in one or more heat exchangers, wherein the cooled water is used to cool a hot chemical process stream, and in so doing is reheated and returned to the cooling tower. The water is continuously circulated in a closed loop, the loop consisting of the heat exchangers, the cooling tower, a circulation pump and an interconnecting piping system.

Conventional spray type gas—liquid contactors, often referred to as absorption towers or scrubbers, operate by dispersing the liquid stream in the form of small droplets, that provide a large amount of surface for mass transfer, and ensure intimate contact between the gas and liquid. Dispersion of the liquid stream can be achieved by passing pressurized liquid thru a conventional spray nozzle, having a small exit opening, that imparts high velocity to the exit stream. The nozzle design is such, as to direct the high velocity liquid exit stream against a secondary stream surrounding the exit stream, so that impaction and liquid dispersion of the exit stream can occur. Dispersion of the exit stream can also be made to occur, by impacting the exit stream against a stationary target appended to the nozzle. Contactors using such nozzles suffer from a disadvantage in that the spray exiting the nozzles has a conical shape, having an included angle of 15 to 90 degrees. As a result, the contact time between gas and liquid varies from 0 at the widest point of the spray to a maximum at the centerline of the spray. If the widest point of the spray exceeds the vessel diameter, the sprayed droplets will impinge upon the walls of the enclosing vessel, coalesce, and the available droplet surface will be drastically reduced, as will the contacting efficiency between gas and liquid. Furthermore, the orifice diameter of the spray nozzle is relatively small, usually less than 1 inch, so that if the liquid or gas feed is contaminated with fouling substances, the nozzle orifices can plug and cause inoperability of the contactor. The spray contactor does, however, have the advantage of operating at very low gas pressure drop, as compared with other types of contactors. Another such contactor, in common use, is the packed tower. This type of device contacts gas and liquid in a vessel containing packing, specifically designed for the purpose, or consisting of crushed stone, ceramics or the like. In operation, the liquid breaks up and flows around the surface of the packing, so as to provide a large surface area for gas-liquid contacting. Unfortunately, because of the small clearances between individual packing particles, the packing is prone to plugging, high pressure drop, and inoperability, should the liquid or gas be laden with fouling substances. Even in the absence of plugging, the packed tower tends to operate at higher gas pressure drop than does a spray tower of equal size, thereby increasing the operating cost of devices needed to move gases thru the tower.

The gas—liquid contactor, which is the object of this invention, overcomes the afore mentioned problems with contactors in present use, by eliminating the need for packing, in the case of packed towers, and by generating a liquid spray of small liquid droplets, having high surface area per unit of tower volume, in the case of spray type contactors. High liquid pressurization is not used, in conjunction with the subject invention, feed liquid instead being dispersed with air or gas at low pressure and low velocity, usually less than 1 inch of water and 100 feet per second respectively. This is accomplished using nozzles of relatively large diameter, usually much greater than 1 inch, which are highly resistant to plugging by fouling substances in the contactor feed.

SUMMARY OF THE INVENTION

The present invention relates to a gas—liquid contactor, the embodiment of which is shown in FIG. 1. The design is such as to intimately contact a vertical downward flow of small diameter droplets, with a vertical upward flow of gas. Such a flow arrangement is termed countercurrent, and is the flow arrangement preferred, because the average driving force for mass transfer of matter from the gas to the liquid, or from the liquid to the gas, is greatest for this flow arrangement. Although countercurrent flow is normally preferred, co-current flow, wherein both the gas and liquid flow upward or downward is not to be excluded as a possible arrangement, to be used in conjunction with the subject invention.

Downward flow of liquid droplets is achieved by means of a multiplicity of low pressure, gas assisted, liquid spray nozzles, located at an appropriate elevation between the main inlet and outlet feed gas nozzles of the contactor containment vessel. Each spray nozzle consists of a vertical tube or conduit, 1 or more inches in diameter and ½ inch or more in length. Liquid feed is introduced at the base of each nozzle, and flows upward and around the outside of the nozzles until reaching the open ends at the top of the nozzles. The liquid then overflows the tops of the nozzles, which are all at the same elevation, and flows downward at the inner surfaces of the nozzles, in the form of more or less continuous films and/or rivulets. The liquid flow rate, in the case of low viscosity fluids such as water, is typically less than 1000 pounds per hour per nozzle. Air or a portion of the feed gas is introduced at the top of each nozzle, in a total amount for the nozzle grouping equal to less than 50% of the total feed gas flow, and flows downward in the same general direction as the liquid feed. In so doing gravitational forces, in addition to shear or drag forces, exerted by the flowing gas on the liquid streams, results in the formation of large liquid droplets and filaments at the base of the nozzles. When these forces exceed the surface tension of the liquid, the filaments are dispersed as small droplets. These droplets are further reduced in size, typically to ⅛ inch or less, by virtue of shear forces generated by relative movement between the droplets and the surrounding counter-flowing feed gas stream. In contrast to the conical droplet profile assumed by conventional pressurized liquid spray nozzles, the flow path of liquid droplets assumed by the low pressure gas assisted spray nozzles, are very nearly vertical and parallel, so that the average gas—liquid contact time, between all elements of the upward flowing gas stream, and downward flowing droplets is the same, and equal to the maximum contact time. This is to be compared with an average contact time, in the case of pressurized liquid spray nozzle usage, equal to 50% of maximum or less. As a result, the height of a contactor utilizing gas assisted liquid spray nozzles, will be correspondingly smaller than one using pressurized liquid spray nozzles.

Gas outlet nozzles, equal to or greater in diameter than the gas assisted spray nozzles and equal to or greater in number than the spray nozzles, surround the spray nozzles in a pattern such that the droplets discharged from the base of each spray nozzle is contacted by an equal quantity of the up-flowing feed gas. Velocity of the feed gas entering and leaving the gas outlet nozzles is typically less than 100 feet per second. The base of each gas outlet nozzle and each spray nozzle are at the same vessel elevation, with the top free end of each spray nozzle terminating in a separate compartment receiving the liquid feed. The top free end of the gas outlet nozzles terminate at a higher elevation, and in a region separated from the spray nozzle liquid feed reception compartment.

Large diameter nozzles route the total feed gas flow, the total liquid feed flow, and the total spray nozzle assist gas flow into and out of the contactor containment vessel. Nozzles are sized on the basis of pressure drop limitations, typical velocities being 50 feet per second or less for gases and 10 feet per second or less for liquids. More than a single nozzle may be used for each service should size restraints so demand.

BRIEF DESCRIPTION OF THE DRAWINGS

FIG. 1 is a longitudinal section thru the cylindrical liquid—gas contactor, showing the proposed embodiment of the invention and the form, location, and orientation of its component parts.

FIG. 2 is a partial plan view taken along section A—A, showing 3 gas outlet nozzles, in an equilateral triangular arrangement, surrounding a single spray nozzle, at the level of lower divider plate, 13. This pattern of 4 nozzles is repeated as many times as necessary to complete an array having the same total gross area as that of the enclosing containment vessel.

FIG. 3 is a partial plan view taken along section A—A, showing an alternate nozzle arrangement, consisting of 4 gas outlet nozzles, at the corners of a square, surrounding a single spray nozzle, at the level of lower divider plate, 13. This pattern of 5 nozzles is repeated as many times as necessary to complete an array having the same gross area as that of the enclosing containment vessel.

FIG. 4 is a side elevation of a single cylindrical spray nozzle, 20, and surrounding gas outlet nozzles, 5, showing the flow of liquid, 21, over the top open end of the spray nozzle, and the flow of feed gas, 28, thru the nozzle. Also shown is the co-current flow of spray nozzle assist gas, 22, and the formation of droplets, 23, at the nozzle outlet. FIG. 5 is a side elevation of a spray nozzle, of alternate design, having an open ended top, 24, with triangular serrations, 25, about the periphery of the nozzle.

FIG. 6 is a partial plan view taken along section B—B showing a plurality of small diameter, equally spaced ports, 26, in the top of the spherically domed closure plate, 27, of the main feed gas inlet nozzle, the outermost boundary of the port array corresponding to the inside diameter of the nozzle.

DETAILED DESCRIPTION OF THE INVENTION

The preferred embodiment of the invention is shown in the vertical longitudinal section of FIG. 1.

Feed gas enters at the bottom of the vertical cylindrical vessel, 1, thru nozzle, 2, flows upward past and around droplet stream, 3, issuing from the bottom periphery of liquid spray nozzles, 4, enters the bottom of feed gas exit nozzles, 5, exits at the top of the nozzles, flows thru wire gauze droplet entrainment separator, 6, and exits the contactor containment vessel at outlet nozzle, 7.

FIG. 2 is a partial plan view of the repeating elements of the liquid spray and gas outlet nozzle array. For the triangular arrangement shown, the total number of liquid spray nozzles is twice the number of gas outlet nozzles. For the square arrangement of FIG. 3 the total number of liquid spray nozzles is equal to the number of gas outlet nozzles. Average feed gas velocity in contactor containment vessel, 1, will ordinarily be significantly lower than the free fall velocity of the liquid droplets issuing from the bottom of the liquid atomizing nozzles and the droplet descent velocity will be equal to the droplet free fall velocity minus the average upward containment vessel gas velocity. Main inlet feed gas nozzle, 2, ordinarily being of smaller diameter than vessel, 1, may therefore have an exit velocity greater than the free fall velocity of the counter flowing droplets, and could therefore suspend the droplets or even reverse the flow of droplets in the path of the jet issuing from the nozzle. To counter this effect, the inlet nozzle is provided with a top, spherically domed, closure plate, 27, which is provided with a plurality of small equally spaced ports, 26. The size and number of ports and the radius of curvature of the spherical dome is chosen such that the centerline velocity of the jets issuing from the ports decays rapidly to a velocity less than the free fall velocity of the downward flowing liquid droplets. As a result, the droplets can flow around the outermost boundary of the jet array, impinge upon the top surface of liquid outlet pool, 8, and exit via main liquid outlet nozzle, 9, connected to the conical bottom of the contactor containment vessel. The conical bottom of the contactor vessel subtends the same included angle as the dome at the top of the feed gas inlet nozzle.

With the aforementioned entering feed gas nozzle arrangement, the effective mass transfer region can be considered equal to that region bounded by the containment vessel walls from an elevation equal to that of the spray nozzle outlets to an elevation equal to that of the feed gas jets at a point where the centerline jet velocity is less than the free fall velocity of the liquid droplets.

The expanded vessel section, 11, serves as a manifold, allowing liquid feed to move freely about the outermost boundary of the spray nozzle array, so as to provide uniform liquid flow to all spray nozzles.

Feed liquid enters containment vessel, 1, thru nozzle, 10, connected to expanded vessel section, 11, flows radially via clearance spaces between liquid spray nozzles, 4, and gas exit nozzles, 5. Liquid feed flows upward, cascades over the top periphery of the spray nozzles and moves downward at the inside nozzle surfaces as a more or less continuous film interspersed with rivulets. Flow is co-current with the downward flowing atomizing gas entering thru nozzle, 12. Liquid movement is realized predominantly by the effects of gravity, but is enhanced and made more conducive to flow uniformity, by virtue of the drag forces exerted by the spray nozzle assist gas on the liquid. For proper operation, construction tolerances must be such as to ensure that liquid feed spray nozzles, 4, are oriented vertically, with all horizontal outlet ends at 90 degrees with respect to the vertical axes of the nozzles, and with all horizontal ends of the nozzles at the same elevation. The use of atomizing gas, however, permits considerable deviation from these requirements.

Open ended bottom outlets of spray nozzles, 4, and open ended bottom inlets of gas outlet nozzles, 5, are attached to a lower horizontal vessel divider plate, 13. The outlets of liquid spray nozzles project a small distance below the undersurface of the divider plate to allow for free formation and release of liquid droplets. The top inlet ends, 14, are all located at the same elevation as the free surface, 15, of the liquid feed. The upper ends, 16, of the feed gas outlet nozzles are attached to a second upper divider plate, 17, plates 13 and 17 separating the inlet liquid feed chamber, 18, from the outlet feed gas chamber, 19.

Droplet formation occurs as a result of liquid film and rivulet breakup at the inner peripheral outlet of the spray nozzles, in a region where surface tension forces are overcome by gravitational forces, and drag forces created by differential movement between the co-currently flowing atomizing gas and liquid feed. Additional liquid breakup occurs downstream of the spray nozzle outlets, due to the counterflowing liquid droplets and feed gas. Droplets so formed cascade downwards in very nearly vertical parallel paths, 3. As a result, contact time between all elements of the upward moving feed gas stream and the downward moving liquid droplets is the same and equal to the length of the effective gas-liquid contact region divided by the downward velocity of the droplets.

What is claimed is:

1. A gas-liquid contact apparatus comprising:
    a vertically oriented containment vessel having a vertically aligned longitudinal axis;
    a main gas inlet means provided adjacent a lower vertical end of the containment vessel;
    a main gas outlet means provided adjacent an upper vertical end of the containment vessel;
    a main liquid outlet means provided adjacent a lower vertical end of the containment vessel;
    a counterflow gas-liquid contact space between the main gas inlet means and the main gas outlet means;
    main liquid feed means arranged above the counterflow gas-liquid space, said liquid feed means feeding liquid to an upper liquid reservoir having a bottom wall and a top wall for containing a predetermined depth of liquid and a headspace above the liquid therein;
    auxiliary, low pressure gas feed means arranged above the counterflow gas-liquid contact space, said auxiliary, low pressure gas feed means feeding gas into said headspace of said liquid reservoir;
    a plurality of first tubular conduits extending vertically between the bottom wall of the liquid reservoir and the headspace therein, thereby defining said predetermined depth of liquid;
    a plurality of second tubular conduits extending vertically between the bottom and top walls of the upper liquid reservoir, thereby forming gas outlet conduits from said counterflow gas-liquid contact space; and
    said plurality of first tubular conduits forming liquid feed spray nozzles wherein cocurrent downflow of said liquid within said reservoir and said auxiliary, low pressure gas provides a gas assist spray of liquid droplets into the counterflow gas-liquid contact space.

2. A gas-liquid contact apparatus of claim 1 having upper and lower liquid reservoirs and provided with a main gas inlet arrangement consisting of a gas inlet conduit at the bottom of the containment vessel the gas inlet conduit having a smaller cross-sectional area than the main gas inlet means;
    and gas inlet conduit being vertically and concentrically located with respect to the main gas inlet means, with the outlet end of the gas inlet conduit having a spherically domed wall having a plurality of equally spaced openings, said openings having axes at right angles to the spherical surface of the domed wall;
    and annular space between the gas inlet conduit and main liquid outlet means forming a lower liquid outlet reservoir the liquid level of which is held at a predetermined distance below the domed outlet of the gas inlet conduit.

3. A gas-liquid contact apparatus of claim 2 wherein first and second tubular conduits contained in the upper liquid reservoir form a pattern of openings at the bottom wall of the upper liquid reservoir such that the centers of each tubular gas conduit is located between the centers of 3 or 4 tubular liquid conduits, the centers of the liquid conduits being located at the apices of equilateral triangles in the case of 3 liquid conduits or at the corners of a square in the case of 4 liquid conduits.

4. A gas-liquid contact apparatus wherein first and second tubular conduits are arranged as in claim 3 except that the centers of each tubular liquid conduit is located between the centers of 3 or 4 gas conduits.

5. A gas-liquid contacting apparatus of claim 1 wherein an expanded containment vessel cross-section is provided above the bottom wall of the liquid reservoir, extending to the feed gas outlet means at the top of the containment vessel.

6. A gas-liquid contacting apparatus of claim 1 wherein the upward average velocity of gas flowing counter to the downward flowing liquid droplets is less than that gas velocity at which the weight of the liquid droplets is equal to the retarding force on the droplet due to the relative motion between the droplet and the surrounding gas stream.

* * * * *